United States Patent
Gordon et al.

[11] 3,752,047
[45] Aug. 14, 1973

[54] SURVEILLANCE CAMERA

[76] Inventors: Larry Gordon, 76 Albany Blvd., Atlantic Beach, N.Y. 11509; Larry J. Paskow, 79th St. Causeway, Harbor Island Spa, Miami Beach, Fla.

[22] Filed: Dec. 13, 1971

[21] Appl. No.: 207,225

Related U.S. Application Data
[63] Continuation-in-part of Ser. No. 72,996, Sept. 17, 1970, abandoned.

[52] U.S. Cl. .................................................. 95/11
[51] Int. Cl. ......................................... G03b 17/46
[58] Field of Search .............. 95/11, 11.5; 355/64; 352/84, 137

[56] References Cited
UNITED STATES PATENTS

| | | | |
|---|---|---|---|
| 3,578,856 | 5/1971 | Thate | 352/172 |
| 1,733,783 | 10/1929 | Medina | 95/11 |
| 3,349,679 | 10/1967 | Lohman | 95/11 |
| 3,601,481 | 8/1971 | Kessler | 352/137 |
| 1,957,889 | 5/1934 | Hopkins | 355/64 |
| 2,419,836 | 4/1947 | Holbrook | 355/64 |
| 2,855,834 | 10/1958 | Doster | 355/64 |
| 3,016,812 | 1/1962 | Chatlain | 95/11 |

*Primary Examiner*—John M. Horan
*Attorney*—Allison C. Collard

[57] ABSTRACT

A surveillance camera particularly for use in a moving vehicle such as a taxicab, having a single frame motion picture camera for photographing images onto a film strip in a film cartridge. The camera includes an illumination means, such as a flash, for illuminating the subject when the picture is being taken. The camera automatically advances the film to the next image when the picture is taken and can be remotely actuated by the driver of the vehicle. The camera is housed in a tamper-proof container which is bolted to the vehicle and has indicating lights to signal the readiness of the camera and the remaining film left in its cartridge.

3 Claims, 8 Drawing Figures

Patented Aug. 14, 1973

Patented Aug. 14, 1973

Patented Aug. 14, 1973

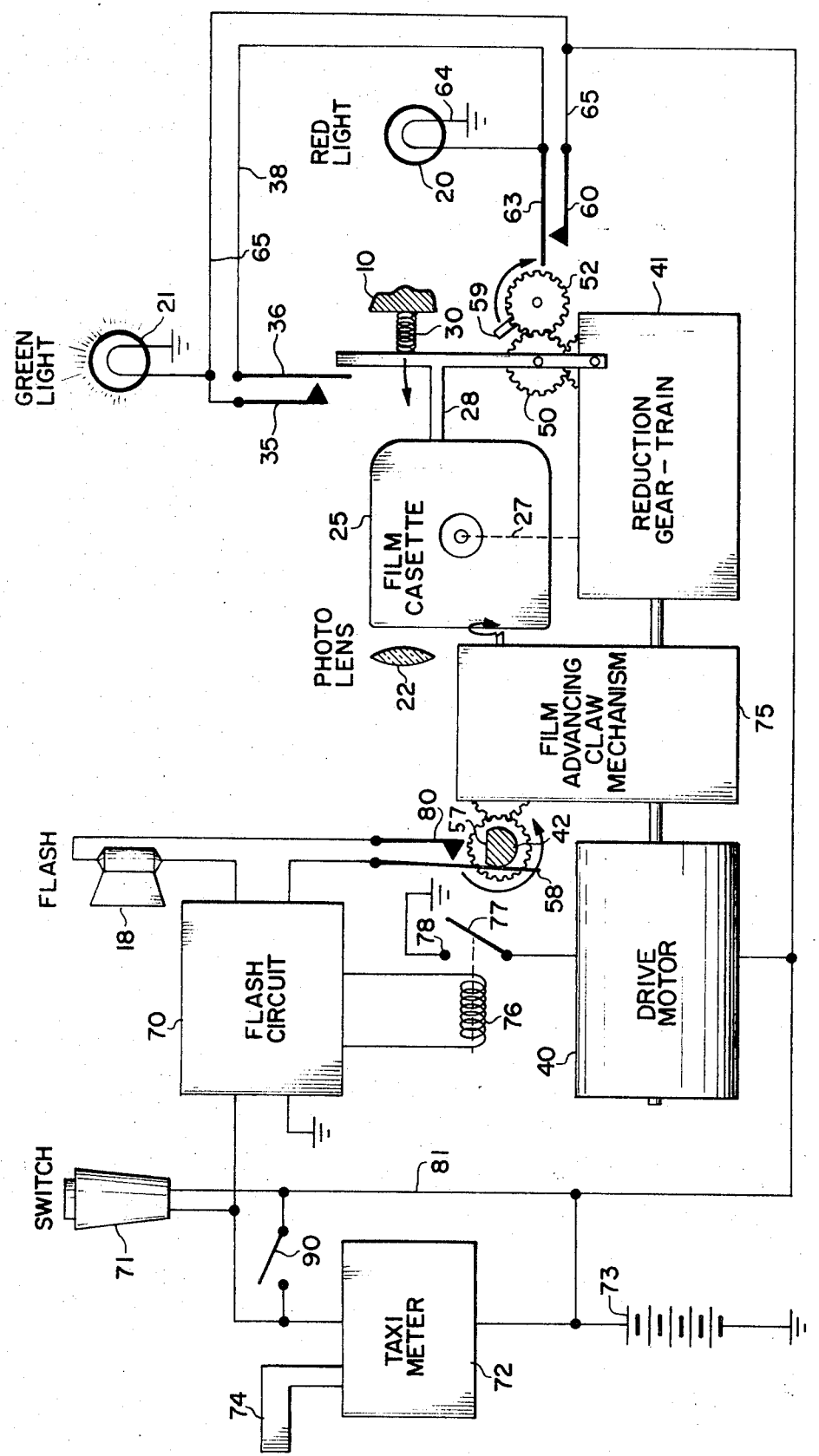

SURVEILLANCE CAMERA

This is a continuation-in-part application of application Ser. No. 72,996, filed Sept. 17, 1970 now abandoned.

This invention relates to a surveillance camera adapted for use in monitoring business transactions.

More specifically, the invention relates to a surveillance camera for use in a vehicle for hire, airline ticket counters and the like for photographically recording the passengers during business transactions.

Vehicles, such as taxicabs, are generally operated by a single driver who frequently becomes a victim of a robbery or other crime. Many vehicles for hire, such as taxicabs, are presently provided with protective shields across the back of the driver's seat in order to physically separate the driver from his passengers. In spite of these protective shields, the number of taxicab robberies have been increasing, particularly in major crime areas of large cities. In many robberies of taxi vehicles, identification of the assailants becomes difficult, if not impossible, particularly if the robbery took place at night, or if the driver of the vehicle was seriously injured or killed.

The surveillance camera can also be used in other applications euch as at an airline ticket counter for photographing prospective passengers and their tickets. The camera will thus aid in identifying passengers who use stolen or false tickets for travel.

Accordingly, the present invention provides a surveillance camera which is housed in a tamper-proof and shielded container mounted in the front part of a vehicle, and having its lens directed at the occupants of the vehicle or passengers at a counter. The surveillance camera of the invention is preferably constructed from a single frame motion picture camera having a large film storage capacity, and capable of taking many pictures in order to photographically record all daily business transactions. The surveillance camera also preferably includes a source of synchronized illumination, such as an electronic flash, integrated into the housing of the camera in order to illuminate the occupants of the vehicle or passengers while the picture is being taken. The camera also includes a magazine or film cartridge in which the film is advanced by a camera motor or a solenoid. The surveillance camera of the invention is designed so that it can be powered by the battery of the vehicle, and operated in response to a push buttom located near the driver. The camera can also be automatically operated when the fare register is turned on after the occupants have been seated in the vehicle.

The surveillance camera of the invention is preferably small in size and housed in a strong, tamperproof container which is firmly bolted to one of the structural frames of the vehicle. The surveillance camera, therefore, cannot be easily removed or disabled except by authorized maintenance personnel who are provided with the tools or keys to unlock and reload the camera between operations. The camera of the invention can be inexpensively constructed and be operated at low cost. In most cases, the film after exposure need not be developed unless the cab driver has been victimized.

It is therefore, an object according to the present invention to provide a surveillance camera for operation in moving vehicles.

It is another object according to the present invention to provide a surveillance camera which is capable of photographing the occupants of the vehicle.

It is still a further object according to the present invention to provide a surveillance camera which is simple in design, easy to construct, and reliable in operation.

Other objects and features of the present invention will become apparent from the following detailed description considered in connection with the accompanying drawings which disclose the embodiments of the invention. It is to be understood, however, that the drawings are designed for the purpose of illustration only, and not as a definition of the limits of the invention.

In the drawings, wherein similar reference characters denote similar elements throughout the several views:

FIG. 8 is a mechanical block diagram illustrating the operation of the camera of the present invention.

Figure 1:
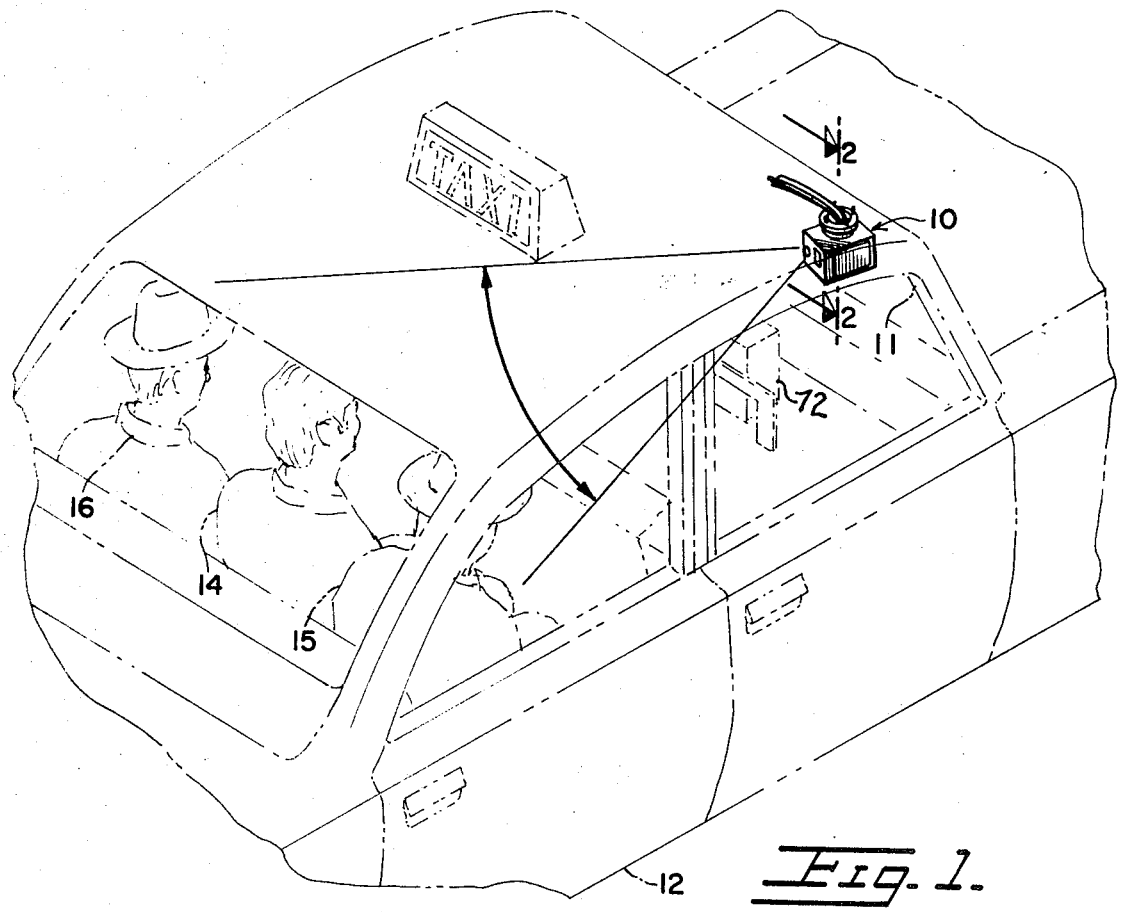
FIG. 1 is a perspective view of an occupied vehicle utilizing the surveillance camera of the invention.
Figure 2:
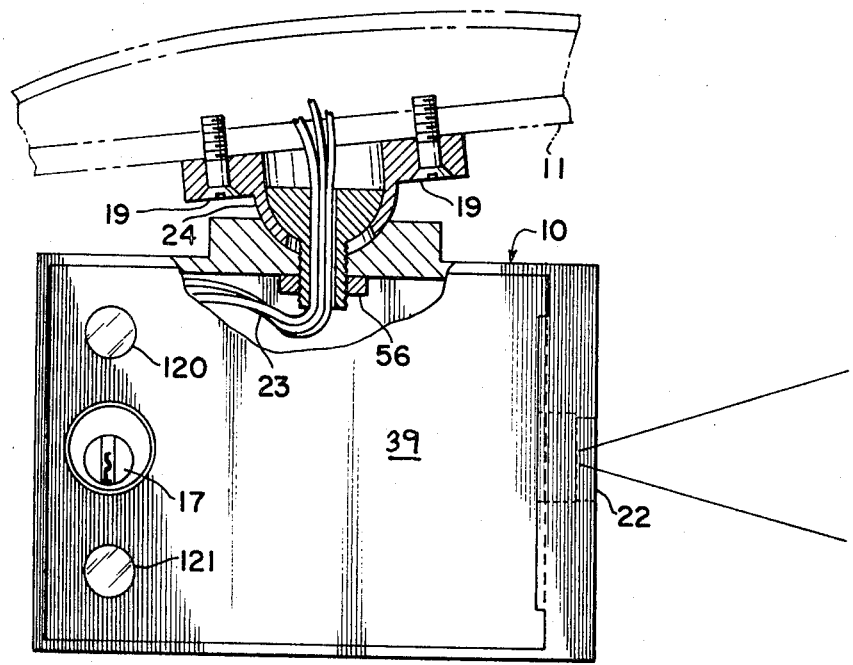
FIG. 2 is a side plan view of the surveillance camera of the invention.
Figure 3:
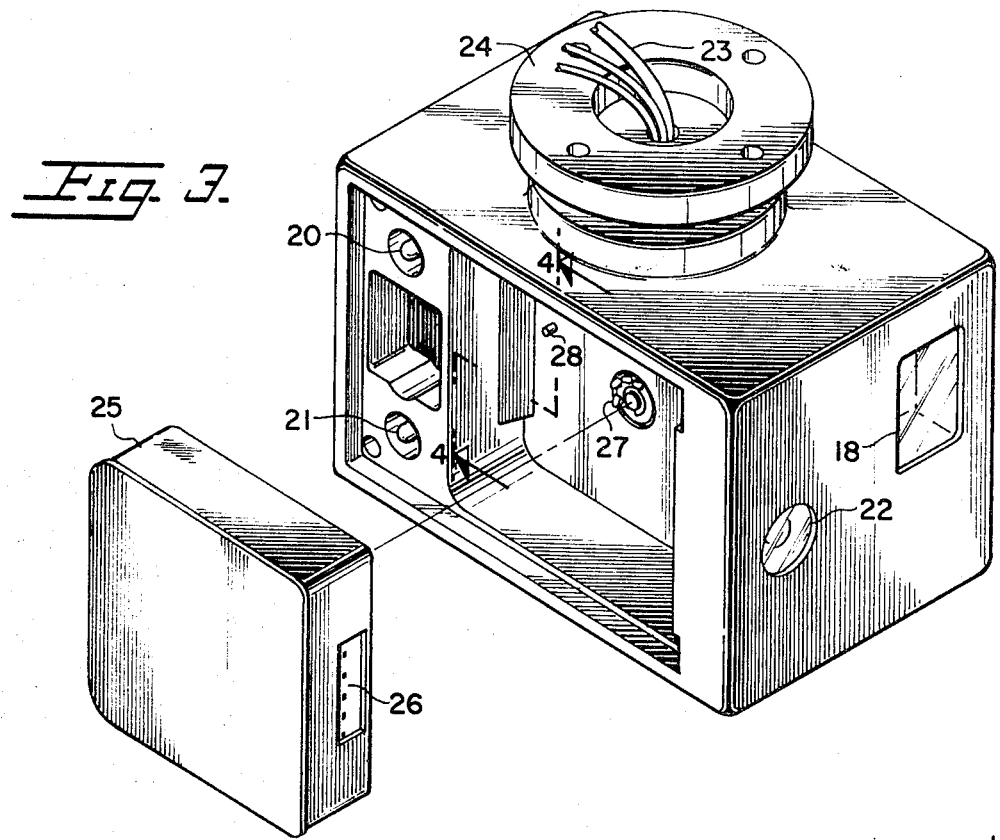
FIG. 3 is a perspective view showing an opening in the side of the camera.

Referring to FIGS. 1-3, there is shown the surveillance camera 10 of the present invention mounted on a post 11 inside the front portion of a motor vehicle 12. Lens 22 is designed to provide a wide angle coverage of passengers 14, 15 and 16 seated in the rear of the vehicle. The camera lens will also photograph passengers seated on the right hand front portion of the vehicle. Surveillance camera 10 is contained in a tamper-proof box which is mounted to post 11 in the vehicle by means of a ball joint 24. Ball joint 24 is bolted to post 11 by means of screws 19 which are not readily accessable since they are partially obstructed by the side wall of camera 10. A nut 56 inside camera 10 threadably secures the camera to the pivotable portion of ball joint 24. Nut 56 is accessable through cover 39 only after lock 17 has been opened. A plurality of electrical cables 23 are coupled to camera 10 through an opening in the pivotable portion in ball joint 24 and are connected to an electrical power source such as the battery of the vehicle and a switch for triggering the camera into operation. Side wall 39 also includes windows 120 and 121 which preferably contain red and green lenses respectively, mounted over corresponding electrical lamps 20 and 21. When cover 39 is removed, as shown in detail in FIG. 3, a film cartridge 25 including film 26 can be inserted into a correspondingly shaped well formed in the camera so that the cartridge can engage spindle 27. Camera 10 also includes an electronic flash 18 positioned on the front of the camera adjacent to lens 22.

Figures 4, 5:
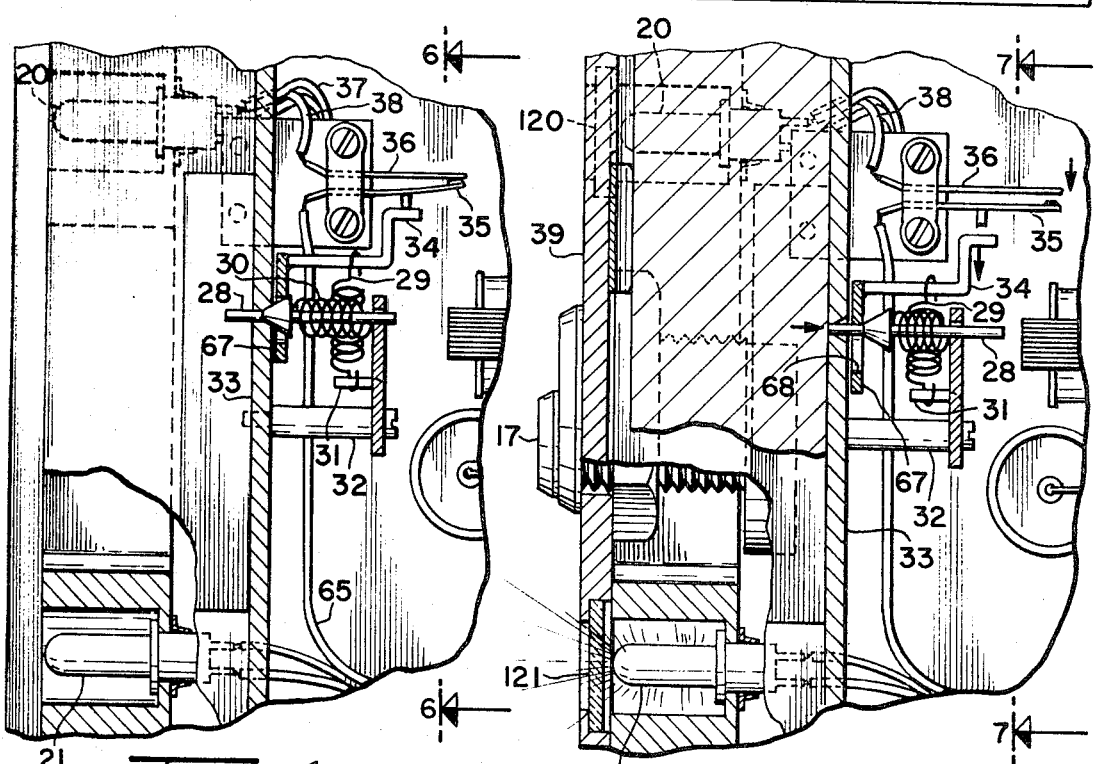
FIG. 4 is a cross-sectional view taken along section 4—4 of FIG. 3.
FIG. 5 is a cross-sectional view similar to FIG. 4 after the film cartridge has been inserted into the camera of the invention.

When film cartridge 25 is removed from the camera, a gage pin 28 which is spring loaded by means of spring 30 as shown in FIG. 4, projects above the surface which seats and supports cartridge 25. Gage pin 28 is slidably inserted through an aperture in supporting surface 33 and includes a conical portion which engages a larger aperture 68 in lever 67. Lever 67 terminates in a right angle step 34 which engages a spring loaded electrical contact 35 to maintain that contact open with respect to companion contact 36. Contact 36 is connected through electrical conductor 38 to one terminal of lamp 20. Contact 35 is connected to electrical conductor 65, which is connected to a power source. When contacts 35 and 36 are closed, such as when film cartridge 25 is removed from camera 10, lamp 20 covered by a red lens 120, is thus turned on to show that there is no film in the camera.

When film cartridge 25 is inserted into camera 10 so as to contact surface 33, and cover 39 closes the open side of the camera, gage pin 28 is depressed as shown in detail in FIG. 5 so that spring 29 will pull lever 67 and thus right angle bracket 24 downward in the direction of the arrow shown, to enable contacts 35 and 36 to open and turn off lamp 20. The opposite end of spring 29 is hooked to pin 31 on a bracket which is bolted through shaft 32 to the inside portion of surface 33.

Lamp 21 covered by a green lens 121 is normally on to show that electrical power is being provided to camera 10 through feed conductors 23.

Figure 6:
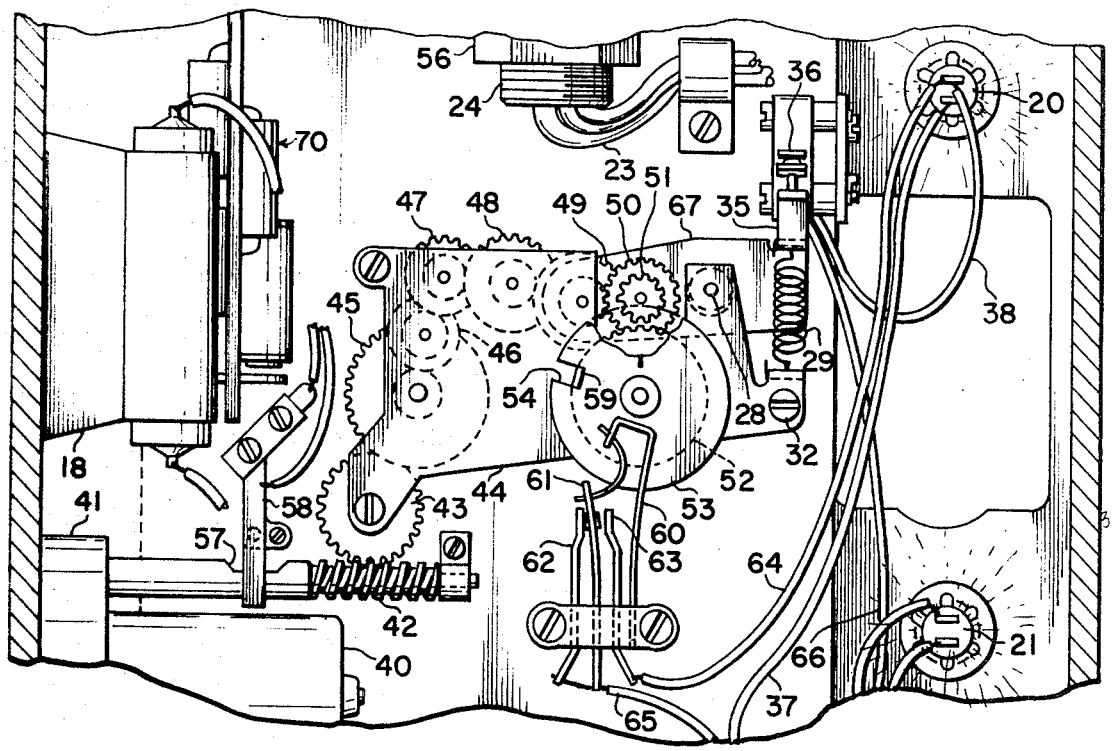
FIG. 6 is a cross-sectional view taken along section 6—6 of FIG. 4.
Figure 7:
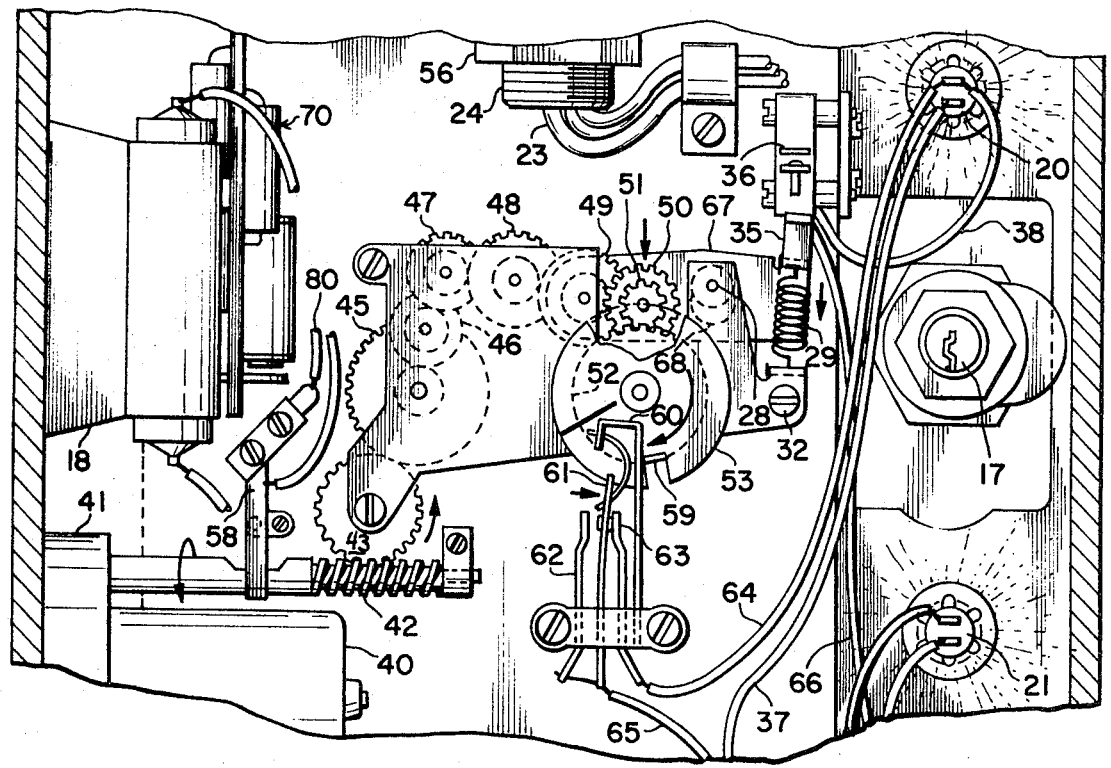
FIG. 7 is a cross-sectional view similar to FIG. 6 showing the position of the camera mechanism when the film in the cartridge has been used up.

FIGS. 6 and 7, which are cross-sectional views of FIGS. 4 and 5 respectively, illustrate the mechanical movement of the camera of the present invention. A motor 40 is coupled to a gear reduction drive 41 so as to provide pivotable movement to a worm gear 42. Worm gear 42 drives spur 43 which is coupled through a plurality of idler gears 45, 46, 47, 48, 49, 50 and 51 which form a gear reduction film counting mechanism. Spur gear 51 is mounted on gear 52 which is attached to a disk 54 containing an upstanding pin 59 near its periphery. Gear 50, and its spur gear 51, mounted on the same shaft, are pivotably connected to lever 67 which moves in response to gage pin 28. Thus, when gage pin 28 is fully depressed, spur 51 engages gear 52 so that disk 54 will advance clockwise as shown in FIG. 7 to eventually move upstanding pin 59 against arm 60 of a switch having contacts 61, 62 and 63. Upstanding pin 59 will reach arm 60 when almost all of the picture frames have been taken on the cartridge. Upstanding pin 59 will urge arm 60 to the left so that contact 61 will close on contact 63 as shown in FIG. 7, and energize lamp 20. A red light will thus appear through lens 120 indicating that there is little or no film left in cartridge 25 so that the cartridge should be replaced. When cover 39 is opened and cartridge 25 is removed, gage pin 28 will slide outwardly and advance lever 67 upwards so as to lift gear 51 out of engagement with gear 52. Disk 54 is spring-loaded so as to rotate counterclockwise to its initial position as shown in FIG. 6. A small bent spring between contacts 61 and arm 60 will cause contact 61 to disengage from contact 63 and close on contact 62 so as to remove electrical poWer from lamp 20.

Thus, the film counting portion of the mechanism has been automatically reset after the cartridge has been removed.

Worm gear 42 also includes a flat portion 57 formed on its drive shaft in engagement with switch arm 58 which is in contact with flash circuit 70 and flash unit 18 as shown in FIG. 8. Thus, for each revolution of worm gear 42, switch arm 58 will engAge contact 80 to connect flash circuit 70 to flash unit 18.

The operation of the surveillance camera will be described as follows:

When taxi meter 74 or switch 71 is activated, power from battery 73 will be connected to flash circuit 70. Flash circuit 70, which contains a transistorized high voltage generator, will quickly charge one or more storage capacitors (not shown in FIG. 8) to a high voltage. High voltage relay 76 will soon cause relay arm 77 to close on contact 78 and energize drive motor 40. The drive shaft on drive motor 40 will then rotate and operate film advance claw mechanism 75 to advance film 26 one frame in a well known conventional manner. Drive motor 40 will also drive worm gear 42 and operate gear reduction train 41 as described with respect to FIGS. 6 and 7. After the film has been advanced, flat portion 57 on worm 42 will contact switch arm 58 so that switch arm 58 wll move against cntact 80 compleating the flash circuit and causing flash 18 to fire. At the same time, film claw mechanism 75 will have also opened and closed the shutter of the camera to photograph the subjects in the vehicle. After the flash has occured, relay 76 will open contacts 77 and 78 to shut off motor 40 in order to terminate the cycle of operation of the camera mechanism. In a particular embodiment of the invention, the entire cycle of operation took place in less than one second. The remaining portions of the mechanism of FIG. 8 have been described with respect to FIGS. 4, 5, 6 and 7.

In an actual embodiment of the invention, the tamper-proof case of camera 10 is constructed of heavy gage aluminum and has a length of five inches, and a width and depth each of three inches. The film casette will be serviced periodically by maintenance personnel after the red light indication has gone on. Obviously, it will not be necessary to develop the film unless the driver of the vehicle has had an encounter with his passengers. It is expected that the presence of the camera will greatly reduce and discourage taxi cab robberies since it will be easier for the police to identify the assailants from the photographic records contained in the camera. The film anticipated for use will be a high speed black and white 8 mm movie film so that many thousands of frames can be taken before the cartridge has to be replaced. Moreover, the cost of replacing the film will be small in view of the large number of pictures which can be stored in the cartridge.

The following is a list of specification of an actual embodiment of the surveillance camera.

| | |
|---|---|
| Frame Size | 4 × 5.36 mm |
| Film Type | Kokak TRI-X 7278 Super 8 Cartridge |
| Film Speed | 200 ASA |
| Film Length | 50 Feet |
| Frames per Roll | 3,600 approx. |
| Lens Type | Super wide angle (six element lens system) |
| Focal Length | Approx. 4 mm |
| Width of Angle | Approx. 70° |
| Lens Opening | 1:56 fixed focus |
| Depth of Field | Approx. 10 in. to inf. |
| Minimum Distance to Camera | Approx. 10 in. |
| Shutter Speed | 1/60 second |
| Flash duration | Approx. 0.15 millisecond |
| Angle of Flash Coverage (ASA) — horizontal | 70° |
| — vertical | 54° |
| Recycling Time for next picture | 1 second |
| Voltage Range | 10 volts to 15 volts, DC, or 115 volts, AC |

| Film Indicator | Red light on, when unloaded, or balance or approx. 4 percent of film length |

In the event that an actual robbery is attempted, the driver of the vehicle could close a toggle switch 90 (FIG. 8) located near the driver's seat. This switch would turn on the surveillance camera for continuous operation so that single frame pictures would be taken at approximately one second intervals. This would provide an enlarged photographic record of the progress of the robbery. If the robbery took place at night, the one second flash intervals would also serve to alert neighboring cars and people that a robbery was in progress.

It is also anticipated that the above-mentioned surveillance camera will find use outside of a vehicle such as at an airline terminal for photographing a perspective passenger and his airline ticket. In this embodiment, the camera may be fitted with a split frame lens or partial prism so that the face of the perspective passener will be photographed together with his airline ticket located at a right angle position below the camera and viewed by the prism. The camera would also include an AC to DC power converter built into the housing so that no separate battery would be required.

While only a few embodiments of the present invention have been shown and described, it will be obvious that many changes and modifications may be made thereunto without departing from the spirit and scope of the invention.

What is claimed is:

1. A surveillance camera for photographing local activity onto a film in a film cartridge in response to a remote switch, comprising:

a housing;

a single frame motion picture camera mounted in said housing;

electronic flash means responsive to said camera and mounted within said housing for providing illumination while a picture is being taken;

visual indication means, including a switch for engaging a film cartridge inserted in the camera and at least one indication lamp, externally visible on said housing, and connected to said switch, for providing a visual indication that the film cartridge is disposed in the housing; and film counting means, including a switch coupled to the camera, for illuminating said indication lamp after a predetermined number of pictures have been taken thereby indicating the amount of film remaining in the film cartridge, and reset means coupled to said visual indication means switch for resetting said film counting means when said film cartridge is removed from said housing.

2. The surveillance camera as described in claim 1, wherein said electronic flash means comprises a high voltage converter, responsive to a remote switch, high voltage switch means coupled to the output of a generator, a motor responsive to said switch, a flash switch coupled to the output of said motor, and a flash unit coupled to said flash switch so that actuation of said remote switch will turn on said generator, operate said high voltage switch means, turn on said motor, close said flash switch and ignite said flash unit.

3. The surveillance camera as described in claim 2, wherein said film counting means is coupled to the output of said motor.